INVENTORS
PETER J. GARROW
EDWIN H. COLLEDGE
BY Charles H. Curry

United States Patent Office 3,515,482
Patented June 2, 1970

---

3,515,482
AEROSOL PHOTOMETER WITH IMPROVED ELECTRONIC CIRCUITRY
Peter J. Garrow, Oakland, and Edwin H. Colledge, Vacaville, Calif., assignors, by mesne assignments, to the United States of America as represented by the Secretary of the Navy
Filed June 27, 1967, Ser. No. 649,366
Int. Cl. G01n 21/12, 21/26; H01j 39/12
U.S. Cl. 356—103                                    3 Claims

ABSTRACT OF THE DISCLOSURE

A detection device for detecting atmospheric contaminants by passing light through sampled air and collecting the light scattered by the contaminants in the sampled air in a mirror system that focuses the scattered light on a light sensing device for continuous monitoring. An electronic circuit including field effect transistors, a photoresistor and gang switches for providing automatic control, high impedance compatible with photomultiplier tube light sensing devices, and means for cancelling out the stray light and dark current of the photomultiplier tube.

---

The invention described herein may be manufactured and used by or for the Government of the United States of America for governmental purposes without the payment of any royalties thereon or therefor.

Present apparatus for the detection of atmospheric contaminants have been rather expensive, non-continuous in operation and relatively bulky.

The object of the present invention is to provide a portable, low cost, automatic device for detecting atmospheric contaminants.

Briefly, the present invention comprises a portable detection device used to detect atmospheric contaminants by drawing air samples through a sampling head. Light from a light source is focused on the sampled air in the sampling head and is collected by a mirror system having a light trap. The light trap is selected to trap substantially all of the light when the sampled air is free of contaminants. When the air includes contaminants, the mirror system collects that light scattered by the contaminants and focuses this scattered light on a sensing device, such as a photomultiplier tube, the output of which continuously indicates the degree of contaminants in the sampled air. The present invention includes a unique circuit including field effect transistors, a photoresistor, and gang switches to provide automatic control, high impedance compatible with a photomultipler tube, and means for cancelling out the stray light and dark current of the photomultiplier tube. The photoresistor is adjusted to provide a current output that cancels that part of the photomultiplier tube current output that is due to the dark current of the photomultiplier tube and the stray light collected on the face of the photomultiplier tube when clean air is being introduced into the system.

Figure 1:
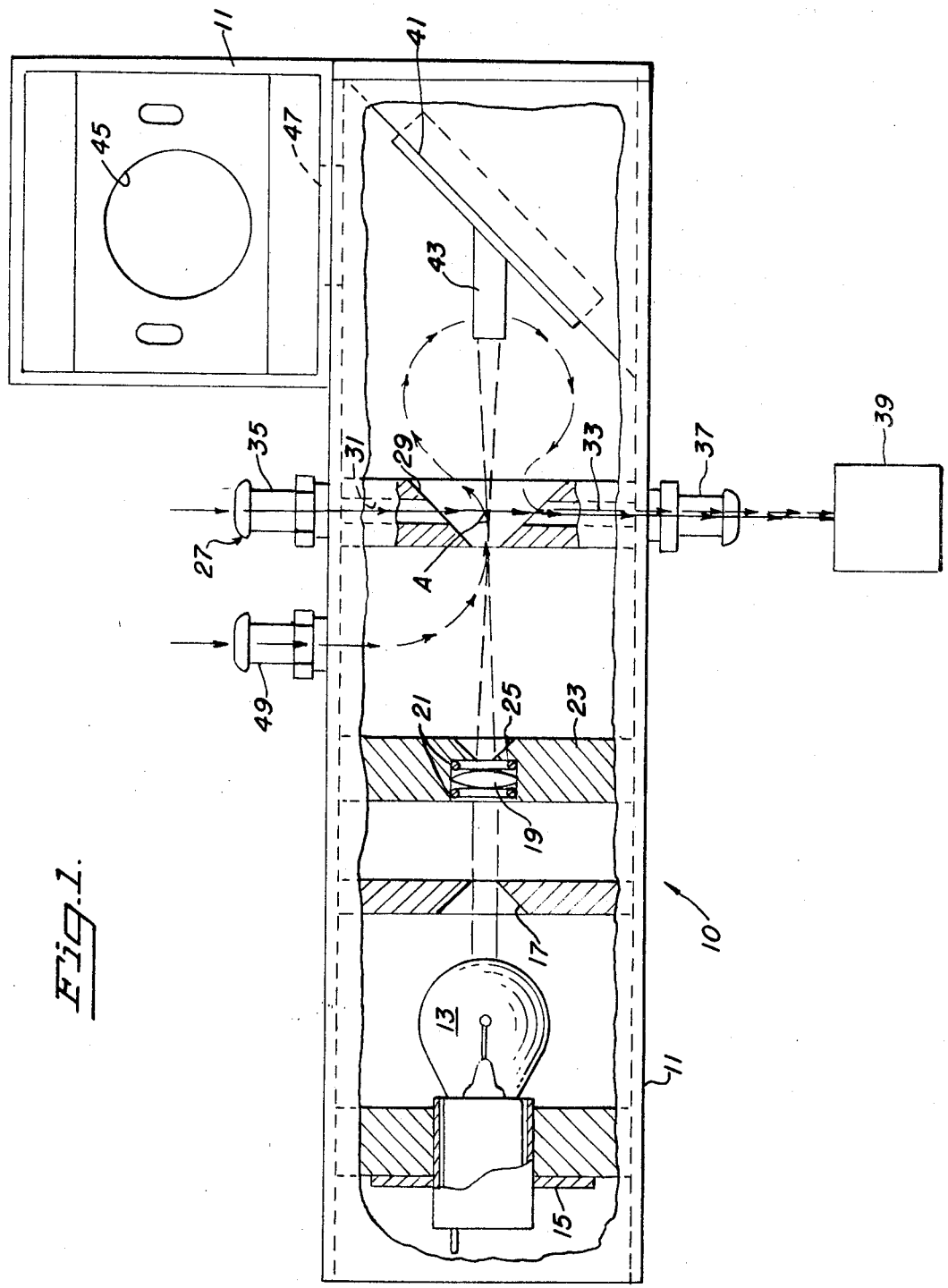
Figure 2:
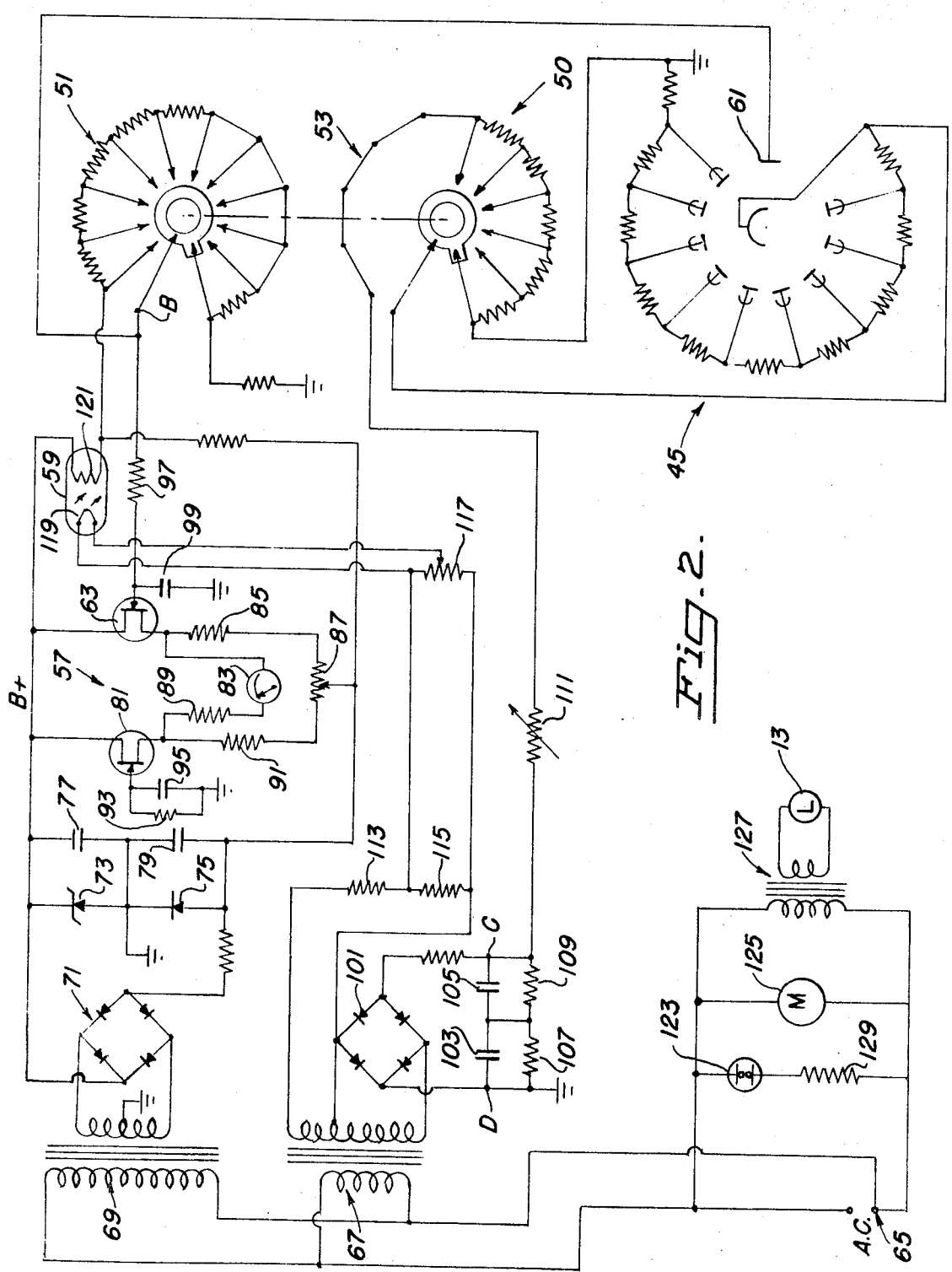

Other objects and many of the attendant advantages of this invention will be readily appreciated as the same becomes better understood by reference to the following detailed description when considered in connection with the accompanying drawings wherein:

FIG. 1 is a side view partly in section of the detector of the present invention; and FIG. 2 is a schematic diagram of the electrical circuit of the detector of the present invention.

Referring to FIG. 1 is a side view partly in section of the mechanical arrangement of detector 10 of the present invention. This detector comprises a frame 11 which is an enclosed structure as illustrated. A light source 13 is connected to one end of frame 11 by support member 15. The light emitted from light source 13 is transmitted through diaphragm 17 and is collected by focusing lens 19. Focusing lens 19 is held by retainer rings 21 which are nested in support member 23 which includes diaphragm 25 through which light is transmitted from focusing lens 19. The light from focusing lens 19 is focused at point A of sampling head 27. Sampling head 27 includes aperture 29, sampling air inlet passage 31 and sampling air outlet passage 33. Preferably, inlet passage 31 is axially aligned with outlet passage 33 and both passages are axially aligned with point A or the center of sampling head 27. As indicated by the solid arrows, the sampled air is communicated through fitting 35 and inlet passage 31, through point A which is located at the center of the cavity formed by aperture 29, and out through outlet passage 33 and fitting 37 to vacuum pump 39. There is a continuous flow of sampled air flowing through the above-described flow path and light from light source 13 is focused at point A which is occupied by this continuously flowing sampled air. The contaminants in the sampled air cause the light to be scattered in the forward direction and towards mirror 41 which is preferably of the parabolic type. Photomultiplier tube 45 is mounted in the upper portion of frame 11 and an aperture 47 is formed in frame 11 between parabolic mirror 41 and photomultiplier tube 45. The light which is collected by parabolic mirror 41 is transmitted through aperture 47 and focused on the face of photomultiplier 45.

In order to flush the detector system, clean air is introduced into the detector system through fitting 49 and follows the flow path as indicated by the dotted lines. Light trap 43 is designed to collect all of the light emanating from light source 13 that is transmitted through aperture 29 when the system is being flushed with clean air. However, light trap 43 does not interfere with the forward angle scattering of light by the contaminants in the air stream introduced into the system through fitting 35. This scattered light will be collected by parabolic mirror 41 and focused on photomultiplier tube 45. In this manner the amount of light collected by parabolic mirror 41 will indicate the degree of contaminants contained in the air flowing through sampling head 27.

FIG. 2 is a schematic diagram of the electrical circuit of the detector of the present invention. The principle features of this circuit include gang switches 50, photomultiplier tube 45, electrometer 57 and photoresistor 59. The purpose of selector switch 51 of gang switches 50 is to convert the current output from anode 61 of photomultiplier tube 55 into a voltage signal and to select a voltage range that is applied to electrometer 57 which indicates the amount of scattered light. The principal purpose of selector switch 53 of gang switches 50 is to select the voltage applied to the dynodes of photomultiplier tube 45 to adjust the multiplication factor thereof. Photoresistor 59 functions to counteract or cancel that part of the current from anode 61 of photomultiplier tube 45 which is due to the dark current of photomultiplier tube 45 and stray light collected on the face of the photomultiplier tube 45, when mounted in detection device 10 of FIG. 1, when clean air is introduced into the system. Selector switches 51 and 53 of gang switches 50 are ganged together as indicated by the dotted line. In general, as the resistance of selector switch 51 is decreased the resistance in selector switch 53 is also decreased and, conversely, as the resistance of eletor switch 51 is increased the resistance in selector switch 53 is increased. More specifically, as selector switches 51 and 53 are rotated counterclockwise from the indicated positions, the resistance of selector switch 53 progressively decreases to zero while the resistance of selector switch 51 remains at a low value and unchanged, except for the initial step. As the selector switches are further rotated counterclockwise then selector switch 53 remains at zero resistance and selector switch 51 increases in resistance until it reaches maximum resistance. Therefore, as selector switches 51 and 53 are rotated counterclockwise from the indicated positions, the voltage applied to the dynodes of photomultiplier tube 45 is progressively increased while the voltage range of selector switch 51 remains at a low value and unchanged, except for the initial step. As the selector switches are further rotated counterclockwise then the voltage applied to the dynodes of photomultiplier tube 45 remains at a constant maximum value and the voltage range of selector switch progressively increases to the maximum voltage range. It can be therefore seen that the sensitivity of detection device 10 is initially increased by increasing the multiplication factor applied to the dynodes of the photomultiplier tube and then increased by increasing the current to voltage conversion scale of the photomultiplier anode current which voltage is applied to transistor 63 of electrometer 57.

Power is supplied to the electrical circuit of FIG. 1 by AC power source 65, which may be a 60 cycle, 110 volt source. This AC power is applied in parallel to step up transformer 67 and step down transformer 69. In step down transformer 69 the output is rectified by full wave rectifier 71 and output of which is applied across Zener diodes 73 and 75 and capacitors 77 and 79. Zener diodes 73 and 75 respectively set the B+ and B− operating voltages and capacitors 77 and 79 filter out any AC ripple. Typically, the AC ripple is that obtained from AC power source 65. Electrometer 57 is connected across the B+ and B− operating voltages and includes field effect transistors 63 and 81. The drain (or cathode) of field effect transistor 63 is connected directly to one side of microammeter 83 and through resistor 85 to one side potentiometer 87. The drain of field effect transistor 81 is connected through resistor 89 to the other side of microammeter 83 and through resistor 91 to the other side fo potentiometer 87. The source (or plate) of each of field effect transistors 63 and 81 are directly connected to the B+ operating voltage. The gate (or grid) of field effect transistor 81 is connected in parallel through resistor 93 and capacitor 95 to ground. The gate of field effect transistor 63 is connected through resistor 97 to point B of selector switch 51 and to anode 61 of photomultiplier tube 45. The gate of field effect transistor 63 is also connected through capacitor 99 to ground in order to shunt any AC ripple that may be in the system is applied to the gate of the field effect transistor.

The resistance of resistor 93 is selected to be equal to the resistance of resistor 97 such that the electrometer 57 will be balanced when the voltage applied to the gate of field effect transistor 63 equals the voltage applied to the gate of field effect transistor 81. This balanced condition is achieved in the FIG. 2 circuit when ground potential or zero voltage is applied to the gate of field effect transistor since the gate of field effect transisor 81 is maintained at ground potential. It can be therefore seen that electrometer 57 will become unbalanced and a reading will be sensed by ammeter 83 when a finite voltage is applied to the gate of field effect transistor 63. To provide a balanced circuit the resistance of resistor 85 is selected to be equal to the resistance of resistor 91 which respectively establish the operating currents of field effect transistors 63 and 81. Field effect transistor 63 has an extremely high input impedance of about $10^{15}$ ohms which produces a very small current drain on the anode of photomultiplier tube 45 and therefore provides for an extremely accurate and sensitive measuring device. The arm of potentiometer 87 is adjusted to produce an electrical balance so that no current flows through ammeter 83 when zero voltage is applied to the gate of field effect transistor 63.

Step up transformer 67 functions to supply power to photoresistor 59 and to photomultiplier tube 45. The output of step up transformer is applied to full wave rectifier 101 which applies a negative voltage, for example, 1,000 volts, to point C and a ground potential at point D. Capacitors 103 and 105 and resistors 107 and 109 function to eliminate AC ripple and voltage spikes from the circuit. In operation, capacitors 103 and 105 are charged by AC ripple and voltage spikes and are discharged through resistors 107 and 109 to ground. Resistors 107 and 109 have sufficiently large ohmic values to prevent draining excessive current from the circuit but also have sufficiently small values to allow the discharge of capacitors 103 and 105 to ground potential. Resistor 111 is adjustable to calibrate or set the gain of photomultiplier tube 45. A floating AC power source is established across resistors 113 and 115 and resistor 115 is shunted across variable resistor 117. The selected voltage across variable resistor 117 is applied to light emitter 19 of photoresistor 59.

Referring to photoresistor 59, as the voltage across light emitter 119 is decreased, by changing the position of the arm of variable resistor 117, the current through light emitter 119 is decreased which decreases the light emitted therefrom. A decrease in light from light emitter 119 causes an increase in the resistance of photoresistor element 121 of photoresistor 59. Conversely, an increase in voltage across emitter 119 results in a decrease in the resistance of photoresistor 121. The photoresistor of 59 has an extremely high input impedance and therefore minimizes the current drain from the anode of photomultiplier tube 45. From this it can be seen that the current output of photoresistor element 121 is variable and is adjusted to cancel that part of the photomultiplier current that is due to stray light and dark current. This calibration is performed when the system is being flushed with clean air by adjusting variable resistor 117 to cause a zero reading on microammeter 83.

In operation, while introducing clean air into the system, selector switches 51 and 53 are rotated counterclockwise from the position shown which increases the sensitivity of the system. The system sensitivity is increased until there is a reading on microammeter 83. Then the current to the light emitter 119 of photoresistor 59 is increased by variable resistor 117 until there is a slight increase in reading on ammeter 83. Next, variable resistors 117 is adjusted for zero reading at each new range as selector switches 51 and 53 are stepped up in range until the highest range sensitivity is achieved for zero reading of microammeter 83. After the system is calibrated as described, then sampled air is introduced into the system and, depending upon the amount of scattered light, selector switches are adjusted so that ammeter 83 reads on-scale. The microammeter reading, coupled with the scale selection of the selector switches, will indicate the degree of contaminants in the sampled air.

Connected in parallel across AC power source 65 are neon lamp 123, motor 125, and transformer 127. Neon lamp 123 is connected in series with current limiting resistor 129 and indicates whether or not power is being received from AC source 65. Motor 125 functions to drive vacuum pump 39 and transformer 127 supplies power to light source 13 of the detection device of FIG. 1.

In view of the foregoing it can be seen that an extremely simple, low cost and portable air sampling device is provided which is capable of accurately and continuously measuring atmospheric contaminants.

It is to be understood that in view of the above teachings that other modifications can be made by those skilled in the art and still be within the scope of the present invention. For example, various modifications can be made to the mechanical arrangement of parts and of the types of lenses, mirrors and light traps. Also many different circuits can be used in place of those described provided each performs in a manner that is compatible with the principles of the present invention.

What is claimed is:
1. A detection device for detecting atmospheric contaminants comprising:
   (a) a light source generating a light beam;
   (b) a mirror;
   (c) a photomultiplier tube providing an electrical output proportional to the light received thereby;
   (d) said light source, said mirror and said photomultiplier tube arranged in series and in optical alignment;
   (e) means positioned between said light source and said mirror for introducing sampled atmosphere into said beam of light;
   (f) a light trap for preventing substantially all light from contacting said mirror and said photomultiplier tube when no contaminants are in said sampled atmosphere;
   (g) means responsive to the electrical output provided by the photomultiplier tube for indicating the degree of contamination of said sampled atmosphere;
   (h) a plurality of resistors connected to the dynodes of said photomultiplier tube;
   (i) a first selector switch for applying a variable resistance in series with said plurality of resistors to vary the multiplication factor of said photomultiplier tube;
   (j) a second selector switch for applying a variable resistance in series with the anode of said photomultiplier tube for varying the current to voltage conversion factor; and
   (k) means interconnecting said first and second selector switches for sequentially first decreasing the resistance of said first selector switch and then increasing the resistance of said second selector switch;
   (l) whereby the multiplication factor of said photomultiplier tube is first increased and then the photomultiplier anode current to voltage conversion factor is increased.

2. The device of claim 1 wherein:
   (a) a photoresistor is operatively connected to the anode of said photomultiplier tube for cancelling that part of the current output from the anode of said photomultiplier tube that is due to factors other than light scattered by contaminants in said sampled atmosphere.

3. The device of claim 2 including:
   (a) an electrometer having first and second field effect transistors;
   (b) the drains of said first and second field effect transistors connected in parallel through a microammeter and a protentiometer;
   (c) the gate of said first field effect transistor being operatively connected to said second selector switch;
   (d) said microammeter indicating the amount of contaminants in said sampled air; and
   (e) said potentiometer balancing said first and second field effect transistors to provide substantially zero current through said microammeter when substantially no contaminants are in said sampled atmosphere.

References Cited
UNITED STATES PATENTS

| | | | |
|---|---|---|---|
| 2,809,295 | 10/1957 | Reiffel | 250—209 X |
| 2,939,361 | 6/1960 | Hock | 250—209 X |
| 3,248,551 | 4/1966 | Frommer | 356—103 X |
| 3,361,030 | 1/1968 | Goldberg | 356—103 |
| 3,383,515 | 5/1968 | Cobb et al. | 250—218 X |
| 3,404,341 | 10/1968 | Young | 324—109 |

OTHER REFERENCES

Gucker et al., "A Comparison Photometer To Measure Scattering of Aerosols and Gases, Using the Latter as Light Scattering Standards," J. Colloid Sci., 10 (12), 1955, pp. 12–23.

Doong, "A Six Decade Linear Response Digitized Electrometer," 1888 Trans. on Nuclear Sci., NS-12, August 1965, pp. 370-2.

Rhinehark et al., FET Performs Well in Balancing Act," Electronics, Sept. 20, 1965, pp. 88–92.

"Logarithmic Electrometer Amplifier"—an Abstract, Rev. Sci. Instr. 37, (2) February 1966, p. 248.

Watson, "Control of Photomultiplier Gain Using a FET," Proc. 1888, 54, April 1966, pp. 693-4.

RONALD L. WIBERT, Primary Examiner

R. J. WEBSTER, Assistant Examiner

U.S. Cl. X.R.

250—207, 218; 324—109; 356—207